United States Patent [19]

Shumway

[11] Patent Number: 5,131,697

[45] Date of Patent: Jul. 21, 1992

[54] PIPE AND COUPLING SYSTEM

[75] Inventor: Paul W. Shumway, Phoenix, Ariz.

[73] Assignee: American Fence Company, Inc., Phoenix, Ariz.

[21] Appl. No.: 744,121

[22] Filed: Aug. 12, 1991

Related U.S. Application Data

[63] Continuation-in-part of Ser. No. 542,978, Jun. 25, 1990, abandoned.

[51] Int. Cl.⁵ .............................................. F16L 21/08
[52] U.S. Cl. .................................. 285/404; 285/111; 285/156; 285/422
[58] Field of Search ................ 285/422, 404, 156, 111

[56] References Cited

U.S. PATENT DOCUMENTS 2,256,455  9/1941  Crawford ........................... 285/422
4,165,892  8/1979  Platek et al. ....................... 285/404

*Primary Examiner*—Dave W. Arola
*Attorney, Agent, or Firm*—Cahill, Sutton & Thomas

[57] ABSTRACT

A pipe is especially fabricated for use in conjunction with locking pin type threadless couplings. The pipe has a thin wall configuration achieved by fabricating it from high tensile steel produced by cold working, or reducing, low carbon steel.

5 Claims, 1 Drawing Sheet

U.S. Patent
July 21, 1992
5,131,697
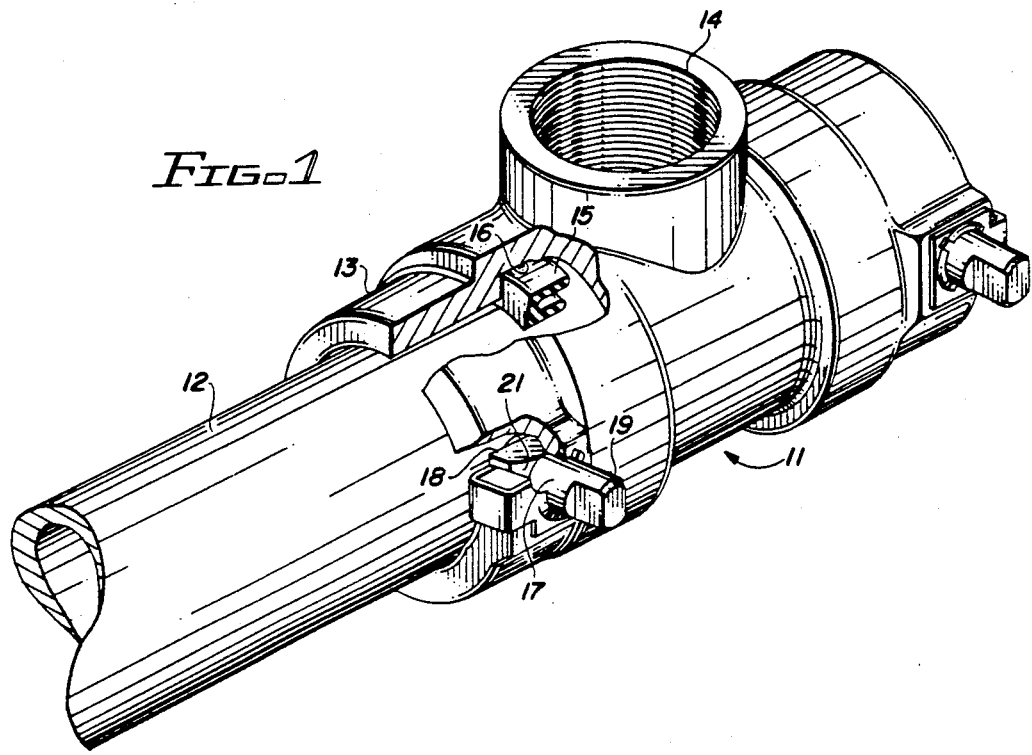
FIG. 1
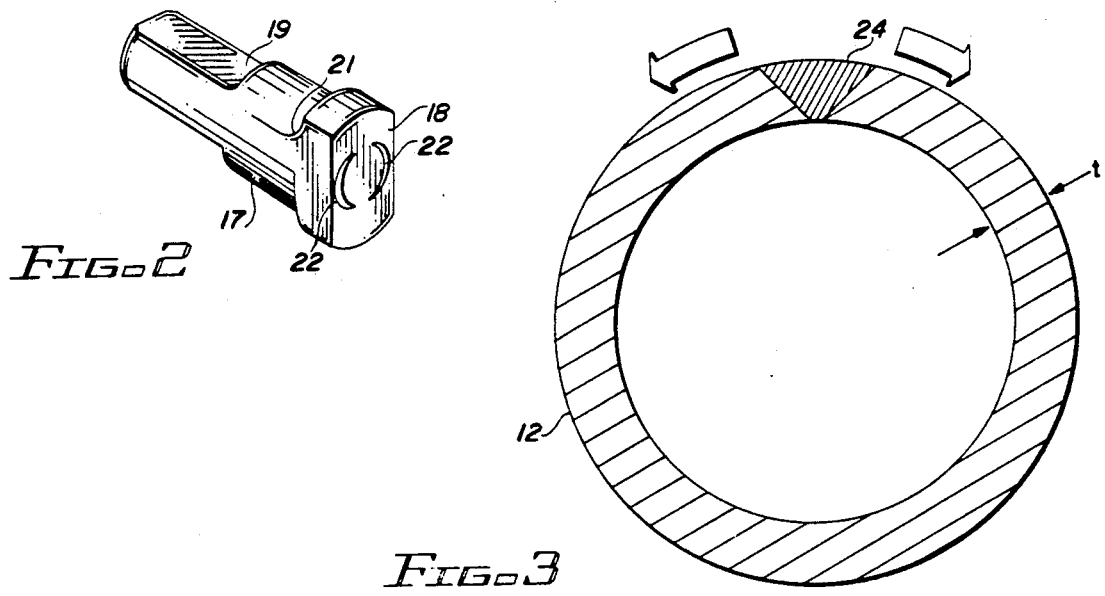
FIG. 2
FIG. 3

PIPE AND COUPLING SYSTEM

This application is a continuation-in-part of my copending application Ser. No. 07/542,978, filed Jun. 25, 1990, entitled "Pipe and Coupling System" now abandoned.

TECHNICAL FIELD

This invention relates to piping systems utilizing threadless couplings.

BACKGROUND ART

Threadless couplings have been developed to simplify and speed the installation of piping systems such as building sprinkler systems. Thread and bayonet-type couplings require relative turning movement between the system components which complicates installation and repair of those components. In addition, forming the threads on the pipe or providing the bayonet connection on the pipe is time consuming and adds to the cost of the installation.

U.S. Pat. No. 4,165,892 granted Aug. 28, 1979 to Edward Piatek and Timothy Brady for "Coupling for Releasibly Securing One End of a Rod-like Member" discloses one form of threadless coupling which has enjoyed some commercial success. This coupling is sold by Victaulic Company of America, South Plainfield, N.J.

The Victaulic brand couplings work well with conventional Schedule 10 and Schedule 40 plain end steel pipe. However, because of the cost of the couplings the overwell system costs can sometimes exceed the cost of systems utilizing more conventional threaded couplings.

There remains a need for a light weight, thinner walled and less expensive pipe to improve the competitiveness and performance of systems utilizing the Victaulic brand couplings.

DISCLOSURE OF THE INVENTION

This invention stems from the discovery that a thinner walled pipe can be employed with threadless couplings if the pipe is made of steel having a significantly higher tensile strength than that used in the Schedule 10 and Schedule 40 pipes. The invention contemplates achieving that higher tensile by cold reduction, i.e. rolling, without annealing an easily welded, low-carbon steel material.

BRIEF DESCRIPTION OF THE DRAWING

The invention is described in greater detail hereinafter by reference to the accompanying drawing wherein:

FIG. 1 is a partially sectioned perspective view of a pipe and coupling system utilizing this invention;

FIG. 2 is a perspective view of a locking component employed in the coupling of FIG. 1; and FIG. 3 is a sectional view through the pipe of FIG. 1.

BEST MODE FOR CARRYING OUT THE INVENTION

Referring particularly to FIG. 1, reference numeral 11 designates generally a coupling adapted to receive, seal against and retain a plain end section of pipe 12. Coupling 11 is of the type disclosed and claimed in the aforementioned Piatek et al. patent. The coupling 11 includes a bushing portion 13 sized to closely receive the end of pipe 12. The coupling may also include a like bushing portion on its opposite side to receive an end of another section of pipe. The coupling may also include a threaded outlet tee 14 for connecting a lateral into the system.

A fluid tight seal between the coupling 11 and pipe 12 is provided by a gasket 15 seated in a channel 16 in the coupling.

The mechanical connection between the coupling 11 and the pipe 12 is established and maintained by a radially movable locking pin 17 extending radially through an opening provided therefore in the bushing portion 13 of the coupling. Locking pin 17 has an inwardly projecting pipe contact head 18 and a outwardly projecting manipulating stud 19. The back, or outer, portion of the pipe contact head 18 has a cam surface 21 thereon which cooperates with a complimentary cam surface on coupling bushing 13 to effect axial movement of pin 17 on a path radially disposed with respect to bushing 13 and pipe 12. Rotation of manipulating stud 19 through approximately 90° cams the locking pin into firm engagement with the pipe 12 to hold it in position in coupling 11. The pipe contact head 18 on pin 17 may be profiled to better grip pipe 12. For example, the head 18 may be provided with curved knife edges 22 which are capable of biting into the surface of the pipe when the locking pin 17 is rotated. (See FIG. 2)

Reference may be had to the aforementioned Piatek et al. patent for further detailed information concerning the coupling 11 and possible modifications thereof.

The present invention is primarily concerned with improving the pipe 12 used in combination with the coupling 11. The objective of this invention is to minimize the wall thickness of the pipe 12 with the attendant advantages of (1) minimizing the weight of the pipe, (2) minimizing the cost of the pipe, and (3) improving the hydraulic performance of systems using the pipe. As is explained below, the invention offers the additional advantages of simplifying the manufacture of the pipe and of improving the reliability of the pipe. Wall thickness is indicated as dimension "t" in FIG. 3.

This invention is based on the discovery that a pipe of high tensile strength material produced by cold working, or reducing, without annealing low carbon content steel is capable of realizing all of the advantages enumerated above. Specifically, the steel from which the improved pipe is made has a tensile strength in excess of 80,000 p.s.i., has a carbon content of 0.0365% or less and preferably approximately 0.010%, and a yield strength of from about 80,000 p.s.i. to 90,000 p.s.i.

For Underwriters Laboratories approval the pipe-coupling combination with which this invention is concerned must be able to withstand a hydraulic pressure of at least 875 p.s.i. without failure of the pipe, coupling or the connection between the two. Presented below are wall thickness comparisons between pipes previously used with the Victaulic brand coupling and a pipe fabricated according to this invention. All of these pipes meet the U.L. standards:

| Nominal Pipe Size | Wall Thickness | | |
|---|---|---|---|
| | Sch - 10 Pipe | Sch - 40 Pipe | Pipe of the Invention |
| 1" | — | .133 | .059 |
| 1¼" | .109" | .140 | .059 |
| 1½" | .109" | .145 | .065 |
| 2" | .109" | .154 | .072 |

Obviously, the pipe made in accordance with this invention, with its thinner wall, uses less material. Therefore, it is inherently lighter and easier to carry than the Schedule 10 and Schedule 40 pipes. Similarly, with less material being used the improved pipe will be cheaper so long as no expensive, complicated steps are employed in its manufacture, and none are.

The thinner wall of the improved pipe also significantly increases the flow area provided by all nominally sized pipes. For a given pressure drop 30-40% more water can be caused to flow through systems employing the thin wall pipe of this invention. Alternatively, the system designer may choose to use a smaller diameter and less costly pipe to achieve the same hydraulic performance achieved with systems using the prior standard pipes.

The employment of low carbon, cold worked without annealing steel to provide the high tensile strength desired for this pipe application is significant for at least two reasons, namely, ease of fabrication and reliability of the pipe. In the past, high tensile strength in steel products has usually been achieved by increasing the carbon content of the steel. But, pipe fabricated from sheet steel requires a reliable continuous weld, and high carbon steel is very difficult to weld reliably.

The weld line in the wall of a pipe fabricated from sheet steel is subjected to considerable "hoop stress" which tends to pull the weld apart. This is illustrated in FIG. 3 in which the large arrows indicate stress applied to a weld 24. Welds for pipes made of low carbon have less of a tendency to become brittle when subjected to hoop stress and are, therefore, more reliable. Furthermore, the hoop stress present in a thin wall pipe is less than that present in a thicker wall pipe. This is another factor contributing to the improved reliability of the pipe of this invention.

From the foregoing it should be apparent that this invention provides an improved pipe for use in systems utilizing threadless couplings.

What is claimed is:

1. A pipe and coupling combination in which said coupling is adapted to receive an end of said pipe and having a locking pin means movable radially inwardly of the coupling for engagement with and retention of said pipe, said pipe being characterized by being fabricated from a low carbon steel having a tensile strength in excess of 80,000 p.s.i. achieved by cold reduction without annealing any portion of said pipe.

2. The combination of claim 1 wherein the pipe steel has a carbon content of 0.0365% or less.

3. The combination of claim 1 wherein the pipe steel has a yield of from about 80,000 p.s.i. to about 90,000 p.s.i.

4. The combination of claim 2 wherein the pipe steel has a yield of from about 80,000 p.s.i. to about 90,000 p.s.i.

5. The combination of claim 1, wherein the pipe steel has a carbon content of approximately 0.010%.

* * * * *